United States Patent
Yamaji et al.

[11] Patent Number: 5,810,389
[45] Date of Patent: Sep. 22, 1998

[54] SIDE AIR BAG DEVICE

[75] Inventors: Takeshi Yamaji; Toru Ozaki; Junji Yamamoto, all of Osaka; Yoshihisa Nakagawa; Shoei Shinoda, both of Aichi, all of Japan

[73] Assignees: Toyo Tire & Rubber Co., Ltd., Osaka; Takashimaya Nippatsu Kogyo Co., Ltd., Aichi, both of Japan

[21] Appl. No.: 809,516
[22] PCT Filed: Jul. 10, 1996
[86] PCT No.: PCT/JP96/01908
   § 371 Date: May 1, 1997
   § 102(e) Date: May 1, 1997
[87] PCT Pub. No.: WO97/04994
   PCT Pub. Date: Feb. 13, 1997

[30] Foreign Application Priority Data

Aug. 2, 1995 [JP] Japan .................................. 7-218122
Sep. 8, 1995 [JP] Japan .................................. 7-231261
Jan. 17, 1996 [JP] Japan .................................. 8-024573

[51] Int. Cl.[6] .................................................. B60R 21/22
[52] U.S. Cl. ...................................... 280/730.2; 280/728.3
[58] Field of Search ............................. 280/730.2, 728.3, 280/730.1, 728.1, 728.2

[56] References Cited

U.S. PATENT DOCUMENTS 5,647,609  7/1997  Spencer et al. ....................... 280/730.2
5,651,582  7/1997  Nakano ............................... 297/216.13
5,676,394  10/1997  Maly ..................................... 280/728.3

FOREIGN PATENT DOCUMENTS 3108564   11/1991  Japan .
3281455   12/1991  Japan .
 532148    2/1993  Japan .
5278548   10/1993  Japan .
 664491    3/1994  Japan .
6107103    4/1994  Japan .
2261636    5/1993  United Kingdom .
WO 96/22904 8/1996  WIPO .

Primary Examiner—Christopher P. Ellis
Attorney, Agent, or Firm—Jordan and Hamburg

[57] ABSTRACT

The invention relates to a side air bag device embedded in a seat side which splits open a stitching part 26 of a seat covering material 20 by means of deployment pressure of an air bag 14 and deploys the air bag 14. In this device, a band 28 for concentrating deployment pressure of the air bag 14 on deployment of the air bag 14 is disposed, and a start to the stitching part 26 splitting open is made by means of this band 28. As a result, the stitching part 26 can be split open rapidly. Also, in the device, a seat pad 72 was interposed between an air bag case 16 and the seat covering material 20. As a result, the softness and feeling of the seat feel is not lost.

6 Claims, 21 Drawing Sheets

SIDE AIR BAG DEVICE

TECHNOLOGICAL FIELD

This invention relates to a side air bag device for protecting an occupant from the side in the case of a collision accident of a vehicle.

BACKGROUND ART

An air bag device is a device for restraining an occupant by inflation of an air bag in the case of a vehicle collision, and generally is made up of an inflator, which is a gas generator, an air bag capable of inflating by gas from the inflator, and an air bag case housing the air bag and the inflator.

Air bag devices are not limited to those which restrain the occupant from the front, and recently, as disclosed in JP-A-06064491, ones which restrain from the side have been being developed. With these side air bag devices, for example, an air bag case housing the air bag and the inflator is embedded in a compartment wall side of a seat such as in the door side of a seat backrest, a seat covering material covering the surface of the seat has in the vicinity of an opening of the air bag case a stitching part where a covering material covering said opening and another covering material are stitched together, this stitching part is split open by a predetermined deployment pressure of the air bag, and the air bag deploys through this split-open gap.

In the above-mentioned splitting-open of the stitching part, depending mainly on differences in the elongation of the covering materials and the elongation of the stitching thread, there is a type of this splitting wherein the stitching part splits open as a result of sewing-machine perforations of the cover material breaking and a type wherein the stitching part splits open as a result of the stitching thread breaking.

The former type is widely used for example with composite seat covering materials made of a vinyl chloride leather and a lining material, and the latter type is widely used for example with composite seat covering materials made by lining a fabric material (raised material, moquette) with a polyurethane foam seat material.

However, there is the limitation that in the case of the former type of splitting wherein sewing-machine perforations of the cover material are to be broken the strength of the stitching thread must be stronger than the strength of the covering material between sewing-machine perforations and in the case of the latter type of splitting wherein the stitching thread is to be broken reversely the seat covering material must be stronger, and both cases require a high-level balance in quality and technology aspects.

It is therefore an object of a first invention of the invention to provide a side air bag device, by discovering a new construction making a start to splitting-open of a stitching part, with which easily it is possible to achieve causing a stitching part to split-open rapidly, a strength balance between a seat covering material and a stitching thread can be achieved simply and it is possible to increase productivity greatly.

On the other hand, the conventional side air bag device described above has the shortcoming that because the air bag case is installed immediately behind the seat covering material there is a hardness in the feel from the seat surface.

It is therefore an object of a second invention of the invention to provide a side air bag device with which by disposing a seat pad between the air bag case and the seat covering material and using a construction such that this pad can be split open it is possible to provide comfort with excellent feel from the seat surface and with no feeling of incongruity in the seat.

DISCLOSURE OF THE INVENTION

A side air bag device of the first invention of the invention is one wherein, in a side air bag device which is an air bag device embedded in a compartment wall side of a seat of a vehicle wherein a seat covering material has in the vicinity of an air bag case opening a stitching part where a covering material covering the opening and another covering material are stitched together and this stitching part is to be split open by means of a predetermined deployment pressure of an air bag, a band for suppressing elongation of the other covering material on deployment of the air bag is provided extending between the other covering material at the stitching part and a fixed member such as a seat frame, one end of the band is fixed to the fixed member and the other end of the band is co-stitched to the other covering material by means of stitching thread of the stitching part.

In this side air bag device, on deployment of the air bag the covering material covering the air bag case opening and the other covering material are first pushed by the internal pressure of the air bag, but because at this time elongation of the other covering material is limited by the band the force of the pushing of the air bag concentrates on the stitching of the band and as a result the stitching part of the seat covering material can be easily split open from this stitching part of the band. As a result of making a start to splitting-open of the stitching part by means of the band in this way this splitting-open can be effected rapidly, and, a strength balance between the seat covering material and the stitching thread can be achieved easily and it is possible to greatly raise productivity.

When giving examples of splitting-open forms of this stitching part of the seat covering material, depending mainly on differences in the elongation of the covering materials and the elongation of the stitching thread, there are the following four:

[1] The stitching part of the seat covering material is split open by the stitching thread starting to break from where the band is co-stitched.

[2] The stitching part of the seat covering material is split open by sewing-machine perforations starting to break from where the band is co-stitched.

[3] The stitching part of the seat covering material is split open by the stitching thread breaking and a small split being formed where the band is co-stitched and this split then being enlarged by breaking of sewing-machine perforations.

[4] The stitching part of the seat covering material is split open by sewing-machine perforations breaking and a small split being formed where the band is co-stitched and this split then being enlarged by breaking of the stitching thread.

Thus, the band initiates breaking of the stitching thread or sewing-machine perforations and the stitching part can be made to split open rapidly.

In a side air bag device according to this first invention, preferably the band is disposed inclined with respect to the stitching line of the stitching part so that the deployment pressure of the air bag concentrates at and splitting-open of the stitching part proceeds rapidly from one side of the stitching of the band. In this case, because the deployment pressure of the air bag is made to concentrate at one side of the stitching of the band, splitting-open of the stitching part can be made more rapid and there are also merits such as that it is possible to obtain a predetermined splitting-open starting point.

In a side air bag device according to this first invention it is also preferable from the point of further facilitating splitting-open of the stitching part that the end of the band on the seat covering material side be so stitched that it moves in a direction peeling from the stitching part when pulled by the other covering material on deployment of the air bag.

Also, in a side air bag device according to this first invention, the band may be disposed passing between the air bag case and the case side covering material.

A side air bag device of the second invention of the invention is one wherein, in a side air bag device which is an air bag device embedded in a compartment wall side of a seat of a vehicle wherein seat covering materials are stitched so as to be joined together in the vicinity of an air bag case opening and this stitching part is to be split open by means of a predetermined deployment pressure of an air bag, a seat pad of a predetermined thickness is interposed between the air bag case and the covering materials and a slit part for allowing the air bag to pass through the pad on deployment is formed in the pad on the inner side of the stitching part. By the air bag case, which conventionally has been adjacent to the seat covering material, being covered with the pad in this way, it is possible to install the side air bag device without losing the softness or the feeling of the feel of the seat.

In a side air bag device according to this second invention, in the part of the pad on the inner side of the seat covering material stitching part, instead of forming a slit part for allowing the air bag to pass through on deployment, a weak part to be split open by deployment pressure of the air bag and allow the air bag to pass through may formed. This weak part can be formed by making the pad thinner than the surrounding. Also, this weak part may be one formed by providing holes or slits intermittently in the form of a tear line.

In a side air bag device according to this second invention, the shape of the slit part or the weak part can be a straight line shape or a bracket-like shape, and ends of the slit part or the weak part may be terminated into a circular shape, a T-shape, an L-shape or a U-shape. Also, the thickness of parts of the pad adjacent to the slit part or the weak part can be made thin in the vicinity of the center of the slit part or the weak part and thick at its ends. By these end treatments, on deployment of the air bag, in the case of the slit part it is possible to prevent its ends from tearing and in the case of the weak part it is possible to make the pad split open with a predetermined shape.

Also, in a side air bag device according to the second invention of the invention, a pad in a side of the seat in which the slit part or the weak part is formed can be made harder than a pad of another part of the seat and formed integrally with the pad of another part of the seat. As a result, because maintenance of the shape of the slit part or weak part becomes easy, it is possible to make the positional relationship of the slit part or the weak part with respect to the air bag fixed and concentrate the deployment pressure of the air bag on the slit part or the weak part and it is possible to make the position of the part of the pad which splits open fixed. Also, because it is possible to make the pad highly elastic with respect to the deployment pressure of the inflating air bag it is possible to increase the strength of a hinge part of the pad opened outward by the splitting-open of the pad. It is also effective in increasing the firmness with which the occupant is held in the seat.

In a side air bag device according to the second invention of the invention it is also possible to form a skin layer of thickness 30 to 200 μm at the surface of the pad in the vicinity of the slit part or the weak part, and by this means the surface of the pad in the vicinity of the slit part or weak part can be protected.

The construction of this second invention may also be applied to a side air bag device according to the above-mentioned first invention. That is, in a side air bag device embedded in a compartment wall side of a seat of a vehicle which by means of a predetermined deployment pressure of an air bag splits open a stitching part in a seat covering material where a covering material covering an opening in an air bag case and another covering material are stitched together in the vicinity of the opening in the air bag case, a seat pad of a predetermined thickness may be interposed between the air bag case and the seat covering material and a slit part or a weak part for allowing the air bag to pass through on deployment may be formed in the pad on the inner side of the stitching part and a band for suppressing elongation of the other covering material on deployment of the air bag may be provided extending between the other covering material at the stitching part and a fixed member such as a seat frame, one end of the band may be fixed to the fixed member and the other end of the band may be co-stitched to the other covering material by means of stitching thread of the stitching part. With this construction, the softness and feeling of the seat are not lost and it is possible to make the stitching part split open rapidly on deployment of the air bag.

PREFERRED EMBODIMENTS OF THE INVENTION

Figure 1:
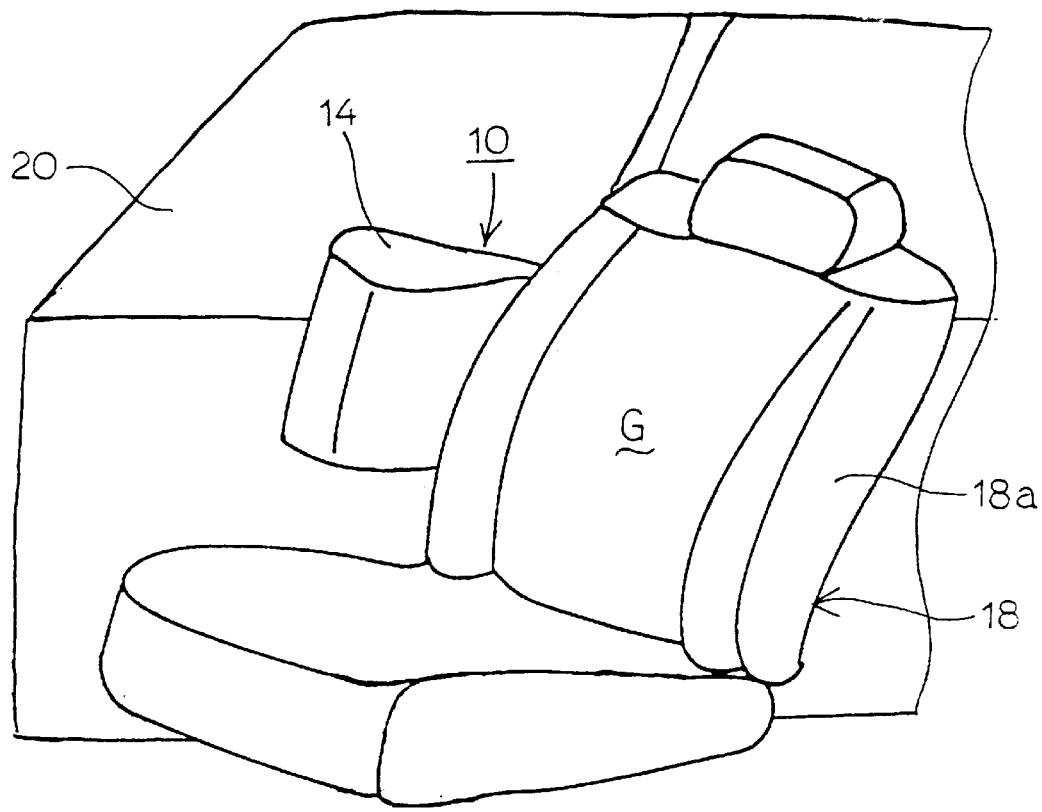
FIG. 1 is a perspective view of part of a compartment interior showing a side air bag device of an embodiment of a first invention of the invention after the device has operated.
Figure 2:
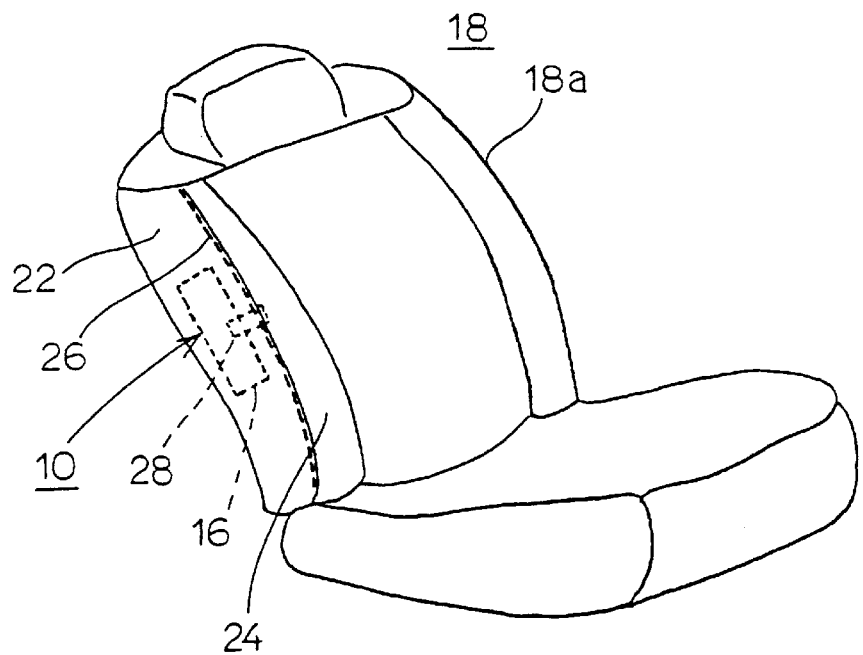
FIG. 2 is a perspective view of a seat fitted with this air bag device.
Figure 3:
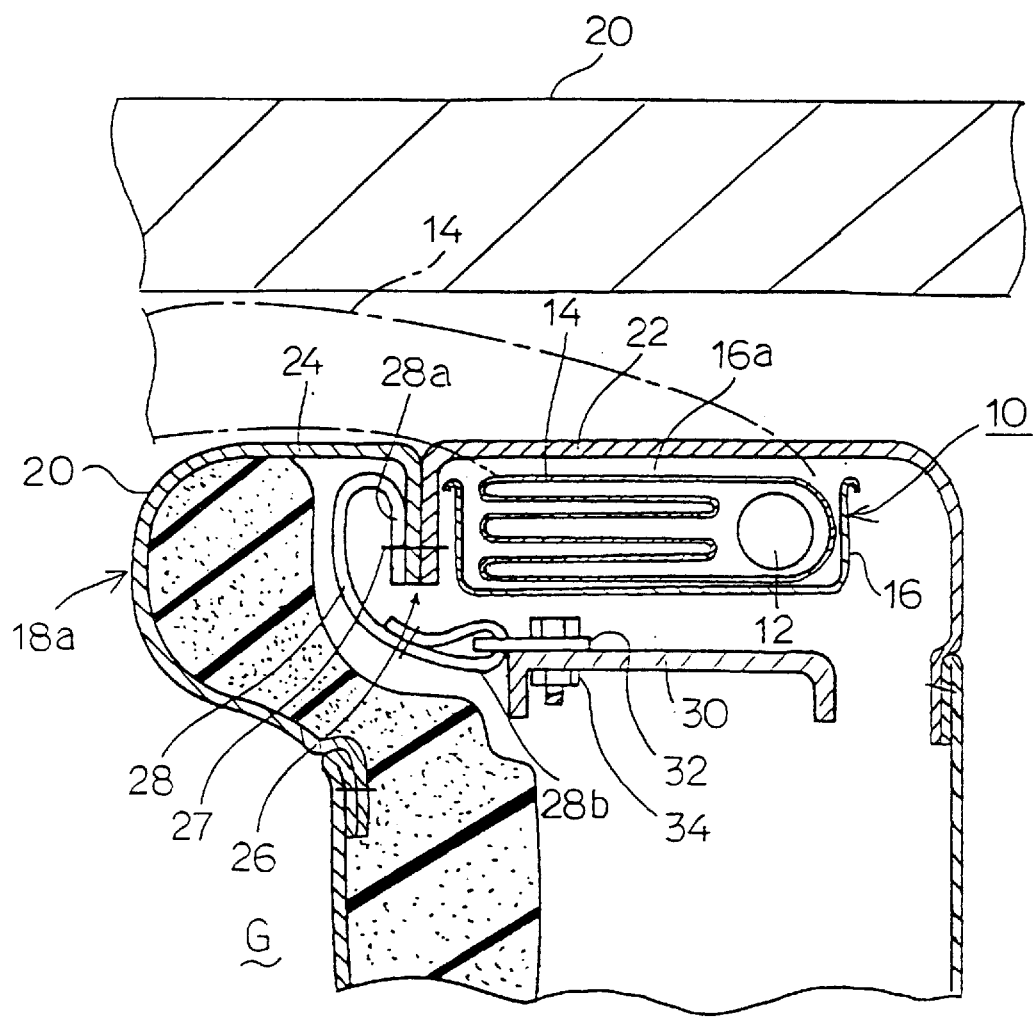
FIG. 3 is a horizontal sectional view of this air bag device.

FIGS. 1 through 3 show a side air bag device of a first embodiment of the first invention of the invention.

This side air bag device 10 has an inflator 12, an air bag 14 and an air bag case 16 and is embedded in the compartment wall (door) 20 side of a backrest 18a of a seat 18 of a vehicle, as shown in FIGS. 1 through 3, and in an emergency deploys the air bag 14 toward the front of the vehicle between the occupant and the compartment wall 20, as shown in FIGS. 1 and 3.

A seat covering material 20 covering the surface of the seat 18 has a stitching part 26 where two covering materials 22, 24 are stitched together at the side of the front of the air bag case 16. That is, as shown in FIG. 3, at the side of an opening 16a in the air bag case 16, a case side covering material 22 covering this case opening 16a and an occupant side covering material 24 extending from this toward the side G on which the occupant sits are projected together and stitched, and this stitching part 26 is disposed inside the seat 18 and extends in a roughly vertically direction along the backrest 18a as shown in FIG. 2. As a result of stitching thread 27 of this stitching part 26 being broken by a predetermined deployment pressure of the air bag 14, the stitching part 26 splits open and the air bag 14 expands through this gap.

In this side air bag device 10, a band 28 for suppressing elongation of the occupant side covering material 24 on deployment of the air bag 14 is provided extending between the occupant side covering material 24 at the stitching part 26 and a fixed member 30 such as a seat frame (or the air bag case 16), the fixed member side end 28b of this band 28 is fixed to this fixed member 30, and the seat covering material side end 28a is co-stitched to the occupant side covering material 24 with the stitching thread 27 of the stitching part 26.

Figure 6:
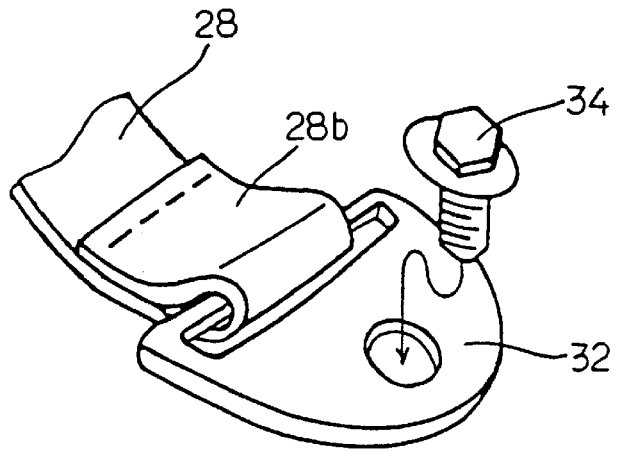
FIG. 6 is a perspective view showing an example of fixing of a band in this air bag device to a fixed member.
Figure 7A:
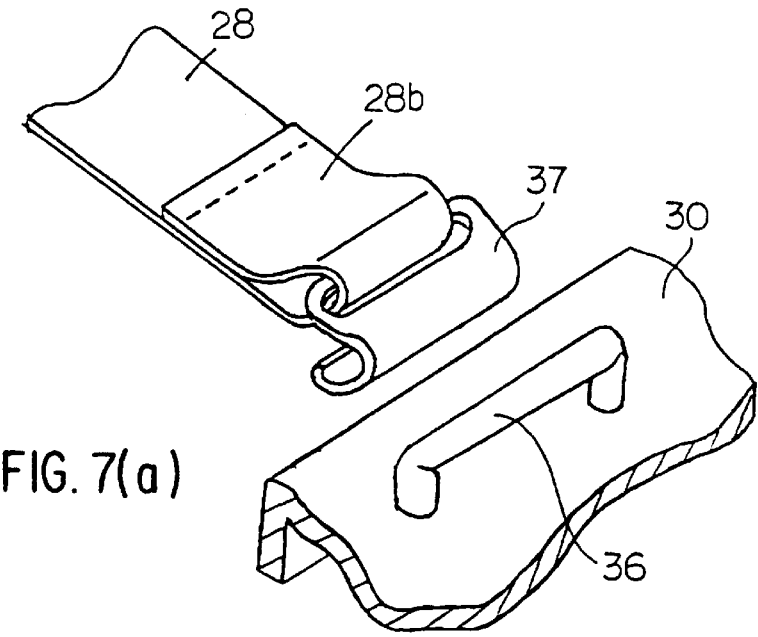
FIG. 7 is views showing another example of fixing of the band to the fixed member, (a) being a perspective view and (b) a sectional view.
Figure 7B:
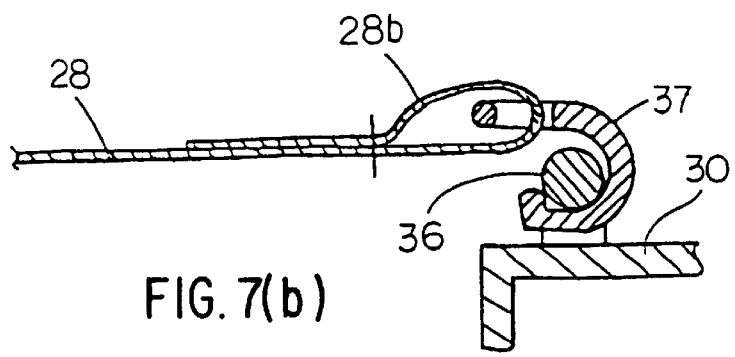

The fixed member side end 28b of this band 28 is fixed to the fixed member 30 by way of a bracket 32 and a bolt nut 34, as shown in FIG. 3 and FIG. 6. For this fixing, as shown in FIG. 7, alternatively a hook 37 or a karabiner-like ring hook (not shown) forcibly fitted onto a round bar 36 of the seat frame or the like may be attached to the fixed member side end 28b of the band 28, and it thereby engaged with the fixed member 30.

Figure 8:
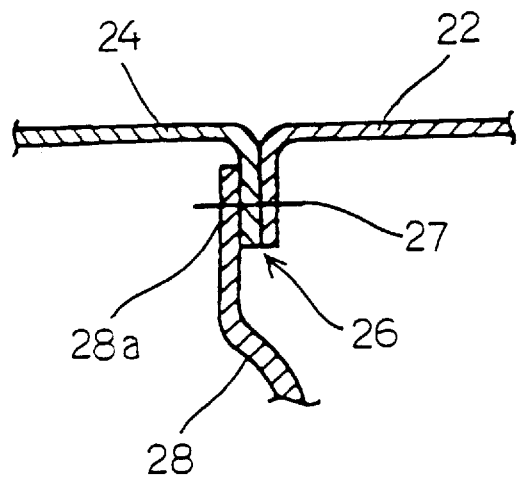
FIG. 8 is a sectional view showing another example of stitching of the band to the seat covering material.

As shown in FIG. 3, the seat covering material side end 28a of the band 28 is stitched reversely-facing so that it moves in a peeling direction when pulled by the occupant side covering material 24 on deployment of the air bag 14. This seat covering material side end 28a may alternatively be stitched so as to move in a shearing direction when pulled by the occupant side covering material 24, as shown in FIG. 8. However, from the point that it makes it possible to break the stitching thread 27 more easily, stitching the seat covering material side end 28a so that it moves in a peeling direction, as described above, is preferable.

This band 28 is preferably made of a cloth made of nylon or polyester or the like having low elongation, and its width should be about 20 to 30 mm. The width of the band 28 is preferably narrow like this compared to the width of the air bag 14 (about 300 mm) because it then concentrates stress applied by the deployment pressure of the air bag 14. However, depending on the position in which the air bag case 16 is embedded, when the width of the band 28 is too narrow compared to the width of the air bag 14, it sometimes happens that the air bag 14 is bent by the band 28 during its inflation (i.e., the air bag 14 expands around the sides of the band 28) and it is difficult to obtain rapid inflation. For this reason, in such cases, the width of the band 28 is preferably about 150 to 400 mm so that the band 28 guides the air bag 14 until the whole of the stitching part 26 has broken. This band 28 can be made of resin or metal instead of cloth, but in that case a hardness remains in the feel of the seat.

Figure 4A:
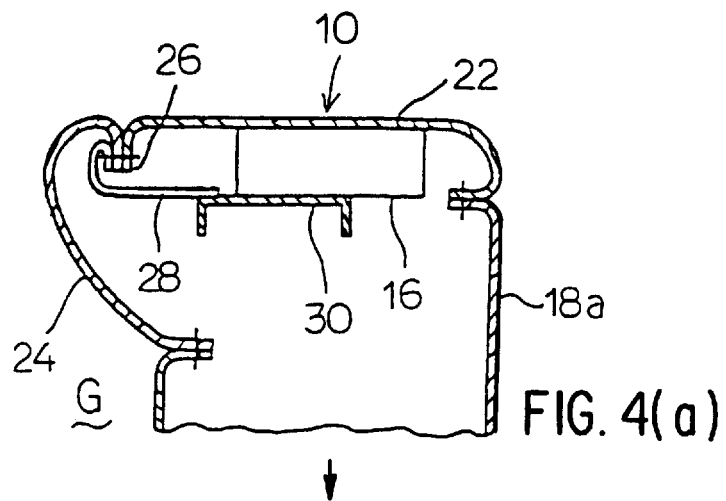
FIG. 4 is outline horizontal sectional views illustrating the operation of this air bag device, (a) showing the device before operation and (b) showing an initial stage and (c) a final stage in its operation.
Figure 4B:
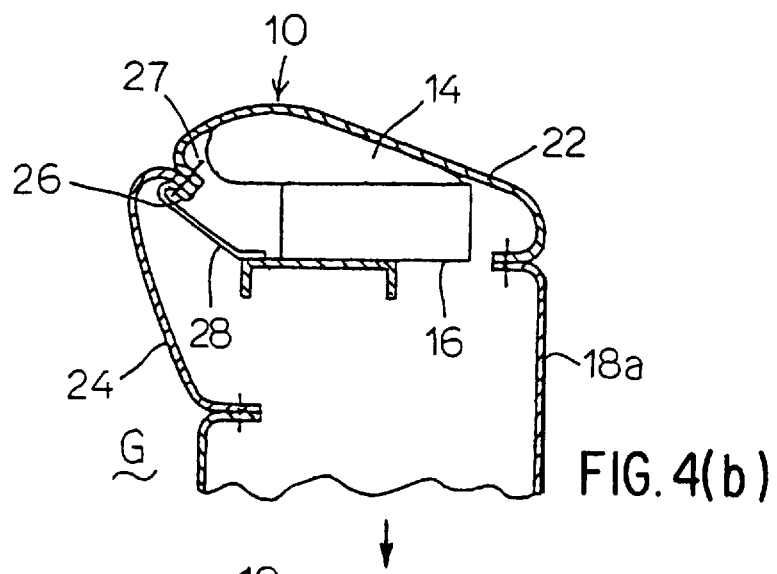
Figure 4C:
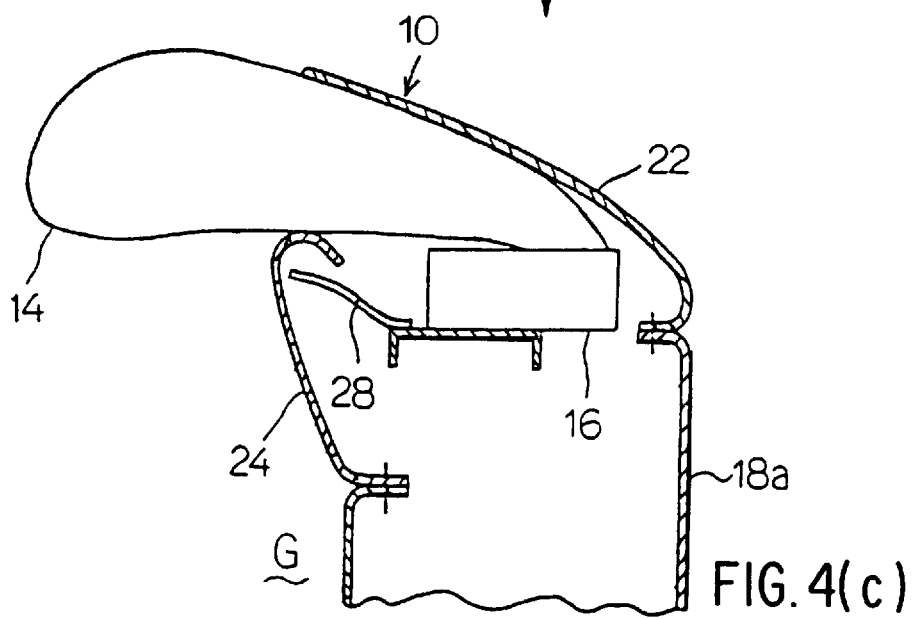
Figure 5A:
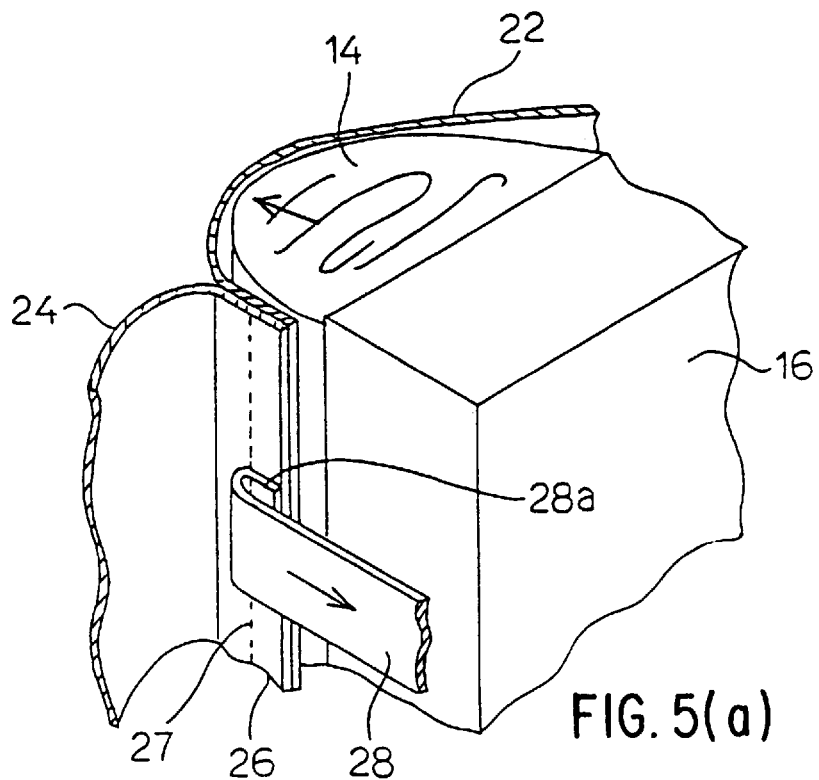
FIG. 5(a) is a perspective view of the device in the state shown in the preceding figure (b)
Figure 5B:
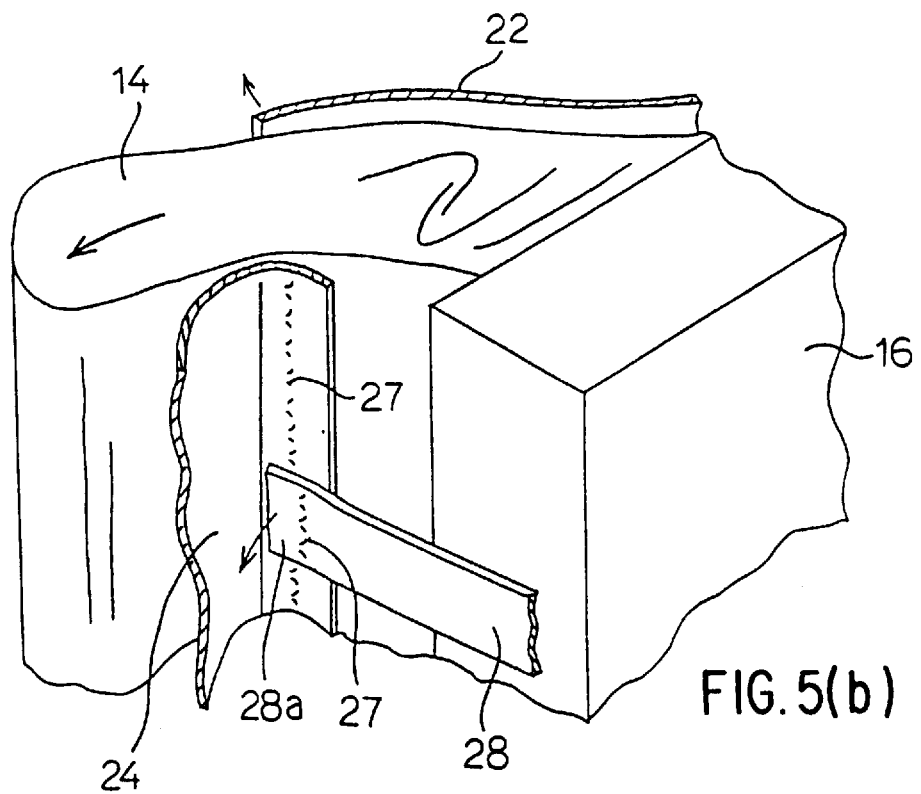
FIG. 5(b) is a perspective view of the device in the state shown in the preceding figure (c).

In this side air bag device 10, when the air bag 14 starts to inflate from the state shown in FIG. 4(a), as shown in FIG. 4(b) and FIG. 5(a), deployment pressure of the air bag 14 first pushes the case side covering material 22 and the occupant side covering material 24 outward. Consequently, the occupant side covering material 24 tends to elongate together with the case side covering material 22, but because elongation of the occupant side covering material 24 is regulated by the band 28, the force of the pushing of the air bag 14 concentrates on the stitching part 26 at the band 28. As a result, as shown in FIG. 4(c) and FIG. 5(b), the stitching thread 27 starts to break from this part and the stitching part 26 of the two covering materials 22, 24 splits open. Because the pushing force of the air bag 14 is concentrated on the stitching part 26 at the band 28 like this, breaking of the stitching thread 27 holding together the covering materials 22, 24 is easy and consequently the stitching part 26 can be split open rapidly.

In the embodiment described above, splitting-open of the stitching part 26 is effected by breaking of the stitching thread 27; however, according to the strength balance between the covering materials 22, 24 and the stitching thread 27, splitting open of the stitching part 26 can also be made to take any of the following other forms.

That is, this splitting-open can be made to take any form such as one wherein sewing-machine perforations start to break from where the band 28 is stitched and the sewing-machine perforations of the stitching part 26 of the covering materials 22, 24 are entirely broken, one wherein the stitching thread 27 where the band 28 is stitched breaks and the band 28 peels away and a small split is formed in the stitching part 26 and then this split is enlarged by breaking of sewing-machine perforations of the covering materials 22, 24 by the pushing of the air bag 14, or one wherein sewing-machine perforations where the band 28 is stitched break and the band 28 peels and consequently a small split is formed in the stitching part 26 and then this split is enlarged by breaking of the stitching thread 27 by the pushing of the air bag 14. This is also the same in the cases of all the air bag devices discussed hereinafter.

Figure 9:
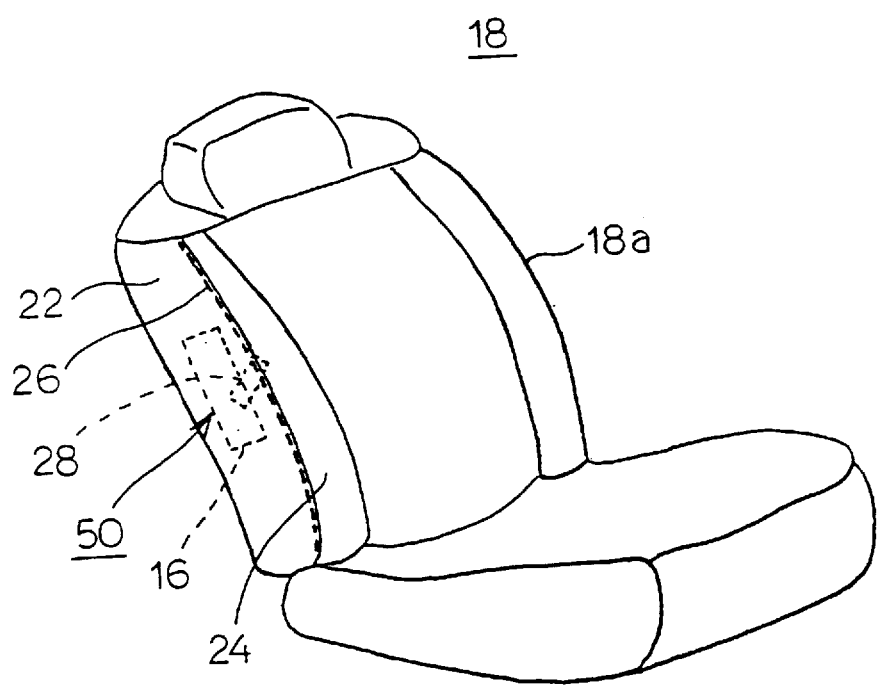
FIG. 9 is a perspective view of a seat fitted with a side air bag device of another embodiment of the first invention of the invention.

FIG. 9 shows a side air bag device 50 of another embodiment of the first invention.

In this side air bag device 50, the orientation of the band 28 with respect to the stitching part 26 is different from in the side air bag device 10 of the embodiment described above. That is, this embodiment has the characteristic that, as shown in FIG. 10, the band 28 is disposed so that the long axis line X, or length direction, of the band 28 is not perpendicular but rather is inclined with respect to the stitching line Y of the stitching part 26, so that deployment pressure of the air bag 14 concentrates at one side 28c of the stitching of the band 28 and splitting-open of the stitching part 26 occurs rapidly starting from this part.

Figure 11A:
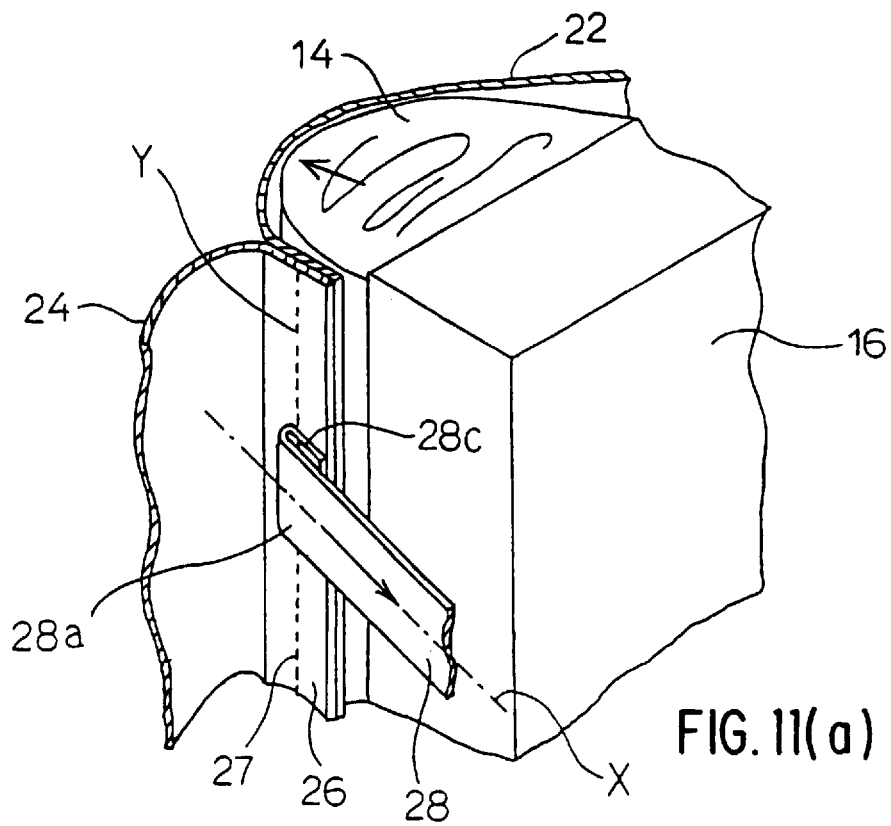
FIG. 11 is perspective views illustrating the operation of this air bag device, (a) showing an initial stage and (b) a final stage in its operation.
Figure 11B:
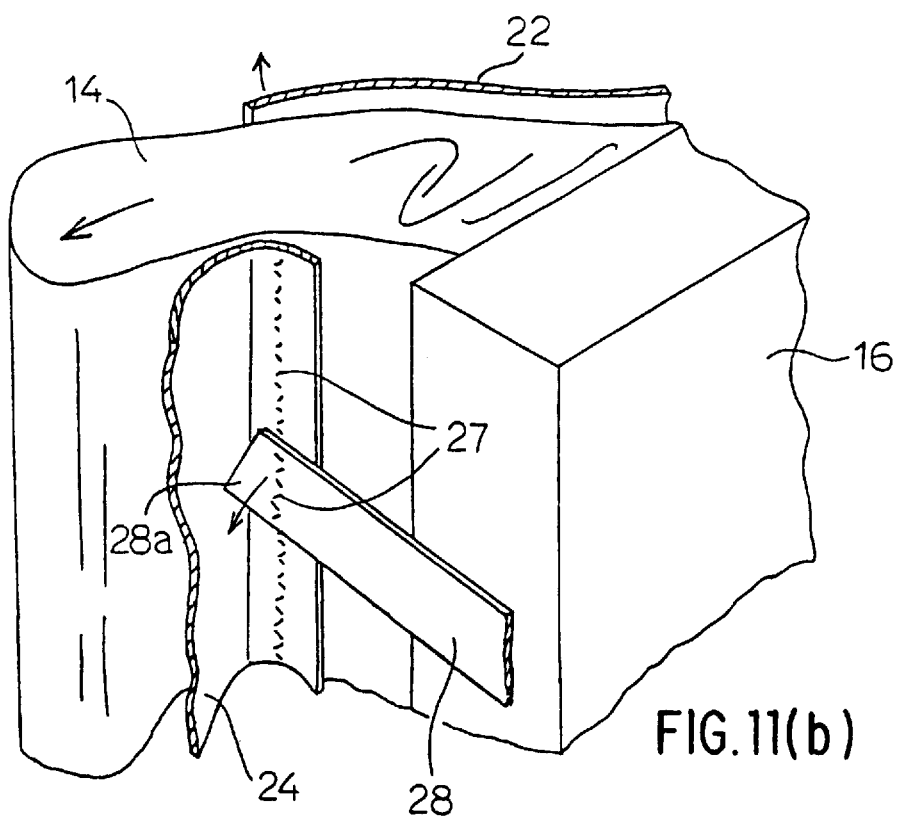

By this means, in this side air bag device 50, as shown in FIG. 11, when on deployment of the air bag 14 the case side and occupant side covering materials 22, 24 are pushed by the deployment pressure of the air bag 14, this pushing force concentrates on the one side 28c of the stitching of the band 28. Consequently, the stitching thread 27 starts to break from this part and the stitching part 26 of the covering materials 22, 24 splits open rapidly. Because by the band 28 being disposed inclined with respect to the stitching line Y of the stitching part 26 in this way it is possible to make the deployment pressure of the air bag 14 concentrate on a single point on the stitching part 26 at the band 28, the stitching thread 27 of the stitching part 26 can be made to break relatively easily and consequently more rapid splitting-open of the stitching part 26 becomes possible. Also, because the stitching thread 27 starts to break from the above-mentioned single point, there are merits such as that a predetermined starting point of splitting can be obtained.

Figure 10:
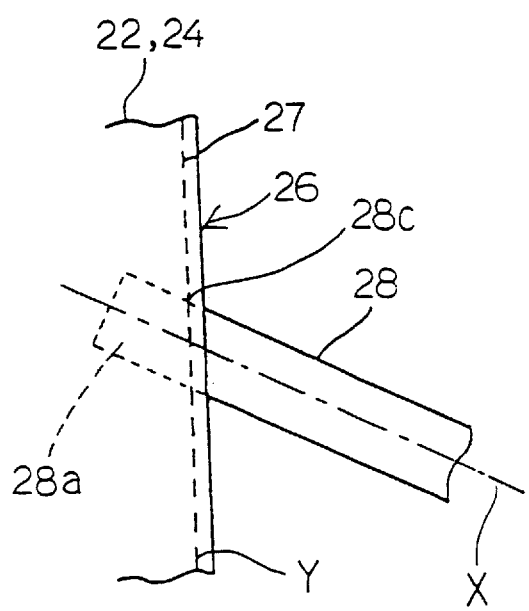
FIG. 10 is a front view showing an example of stitching of a band in this air bag device to a seat covering material.
Figure 12:
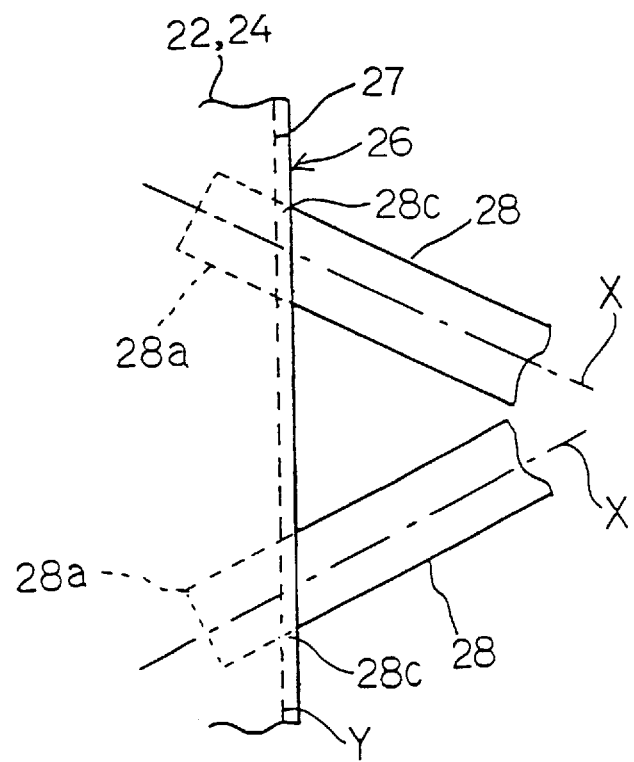
FIG. 12 is a front view showing another example of stitching of a band in this air bag device.
Figure 13:
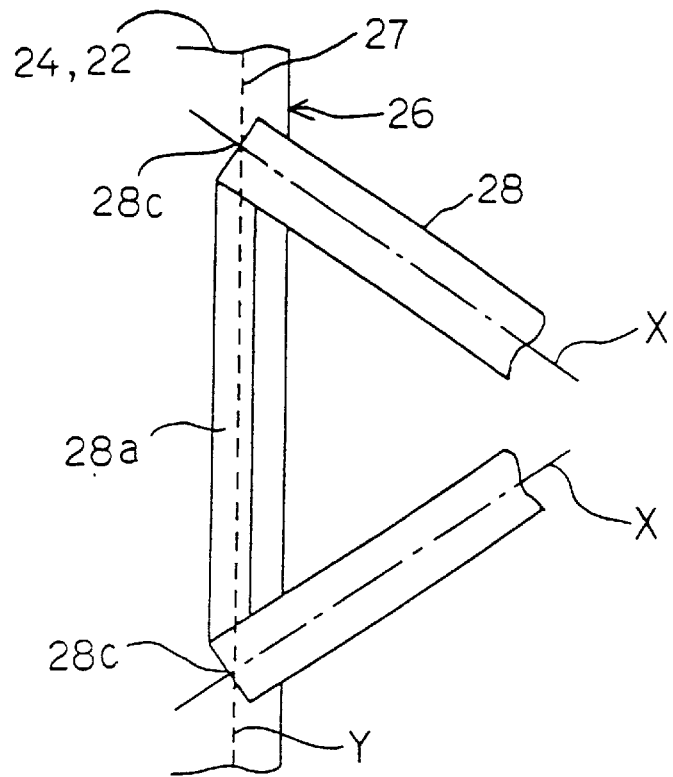
FIG. 13 is a front view showing a further example of stitching of a band.
Figure 14:
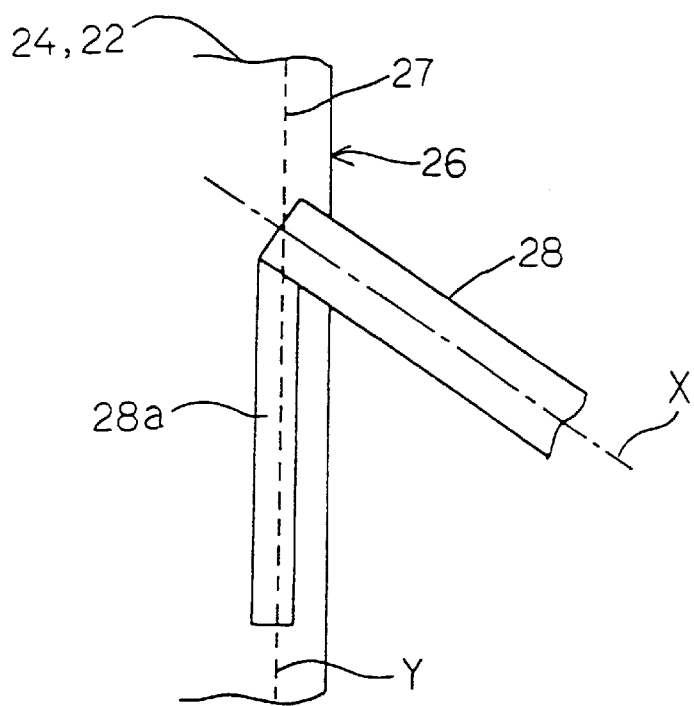
FIG. 14 is a front view showing a further example of stitching of a band.
Figure 15:
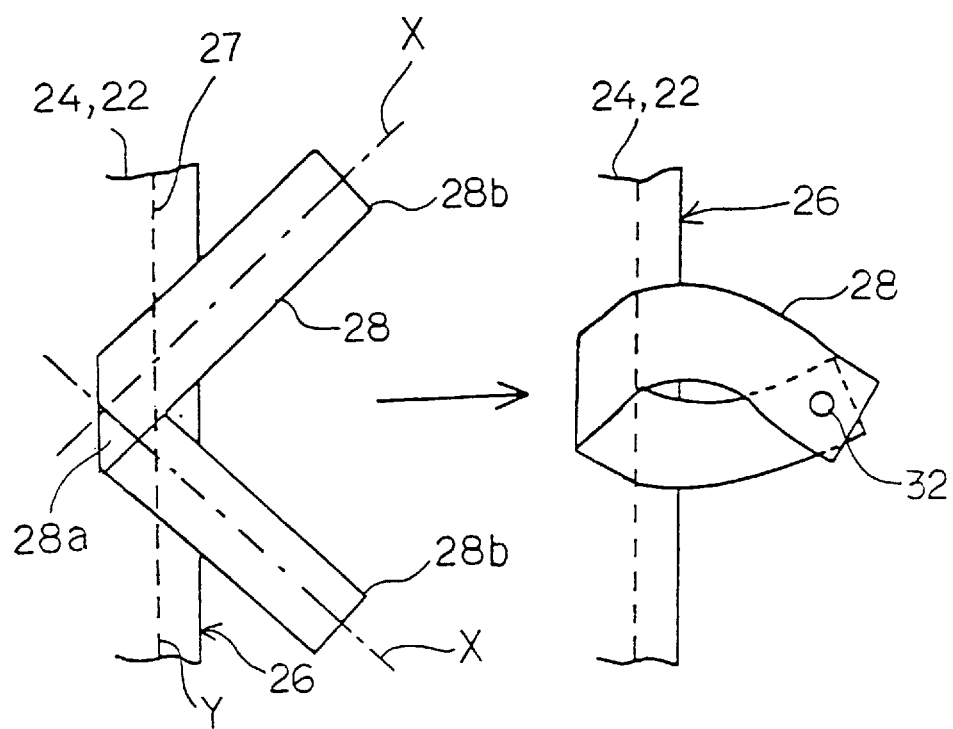
FIG. 15 is a front view showing a further example of stitching of a band.

When the band 28 is disposed inclined with respect to the stitching line Y of the stitching part 26 in this way, it is made basic to dispose a single band 28 pointing diagonally downward with respect to the stitching line Y of the stitching part 26 at an acute angle of elevation, as shown in FIG. 10, but instead of this, one of two bands 28, 28 may be disposed pointing diagonally downward with respect to the stitching line Y of the stitching part 26 and the other may be disposed pointing diagonally upward with respect to the stitching line Y, as shown in FIG. 12. Also, as shown in FIG. 13 and FIG. 14, the seat covering material side end 28a of the band 28 may be extended and bent and stitched along the stitching line Y. Or, as shown in FIG. 15, a single band 28 may be bent in a V-shape and the bent portion stitched to the stitching part 26 as a seat covering material side end 28a and two fixed member side ends 28b, 28b respectively extending upward and downward from there may be brought together and fixed to the fixed member 30 with a single bolt 32.

Also, the band 28, besides being one stitched while oriented at an incline with respect to the stitching line Y of the stitching part 26 as described above, may alternatively be made one stitched while perpendicular with respect to the stitching line Y of the stitching part 26 and then oriented at an incline by for example having its fixed member side end 28b fixed diagonally above or diagonally below the seat covering material side end 28a.

Figure 16:
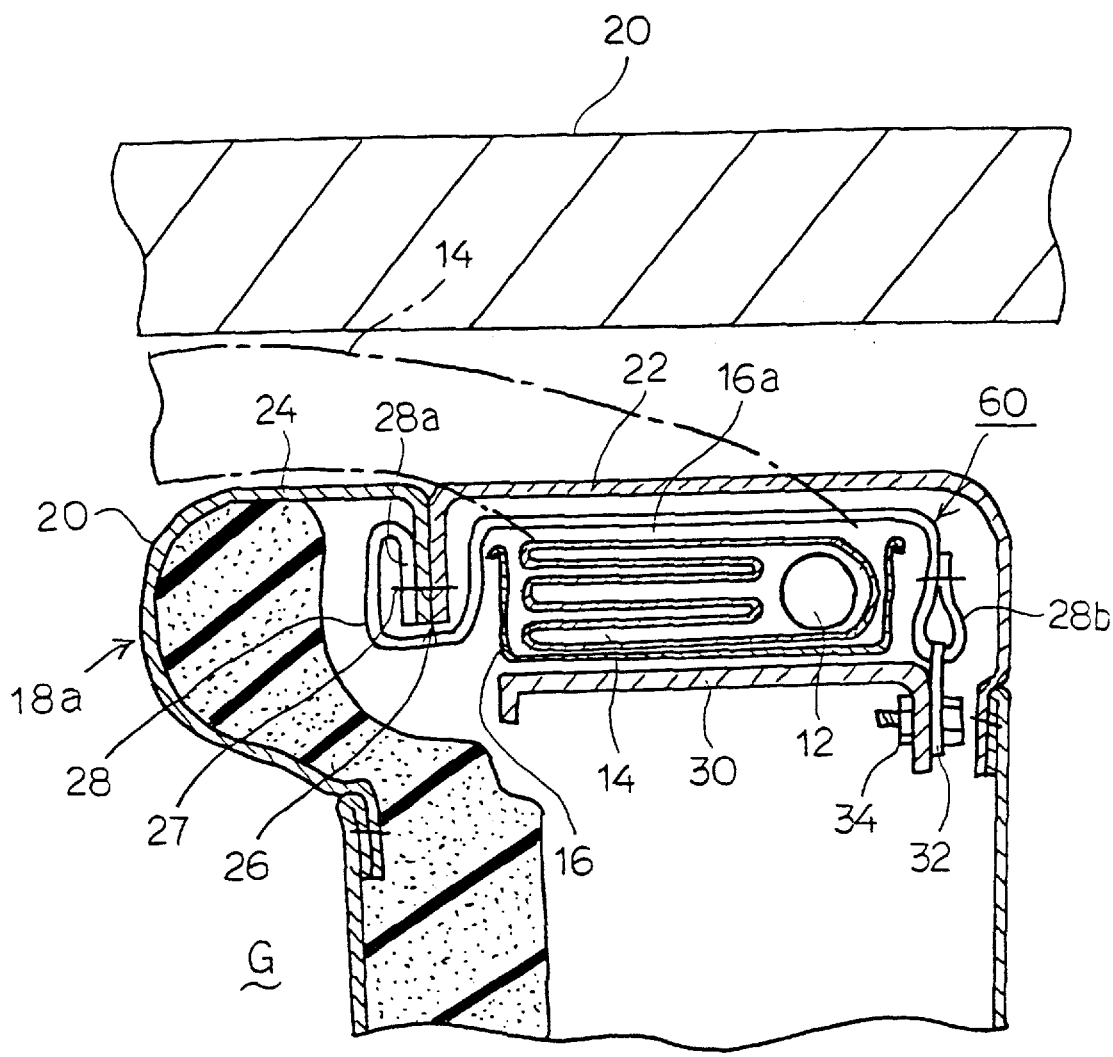
FIG. 16 is horizontal sectional view showing a side air bag device of another embodiment of the first invention of the invention.

FIG. 16 shows a side air bag device 60 of another embodiment of the first invention of the invention.

This side air bag device 60 differs from the side air bag device 10 described above in the point that the band 28 extending between the occupant side covering material 24 at the stitching part 26 and the fixed member 30 is disposed passing between the air bag case 16 and the case side covering material 22. That is, in this embodiment, the band 28 is disposed extending rearward passing between the opening 16a of the air bag case 16 and the case side covering material 22 from the seat covering material side end 28a stitched to the stitching part 26 and the fixed member side end 28b is fixed to the fixed member 30 behind the air bag case 16.

Figure 17A:
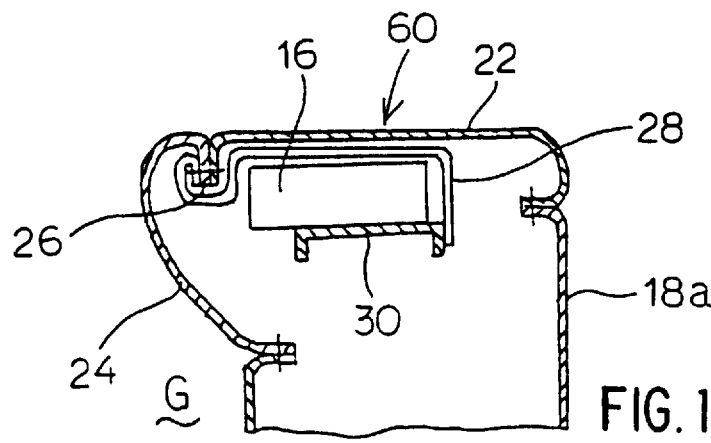
FIG. 17 is outline horizontal sectional views illustrating the operation of this air bag device, (a) showing the device before operation and (b) showing an initial stage and (c) a final stage in its operation.
Figure 17B:
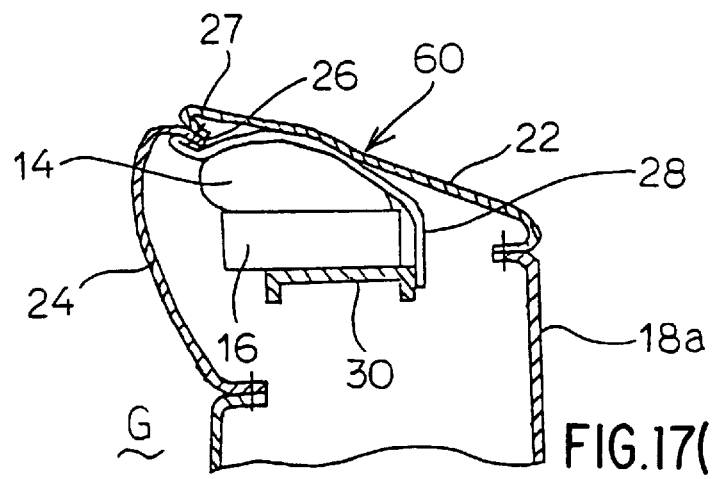
Figure 17C:
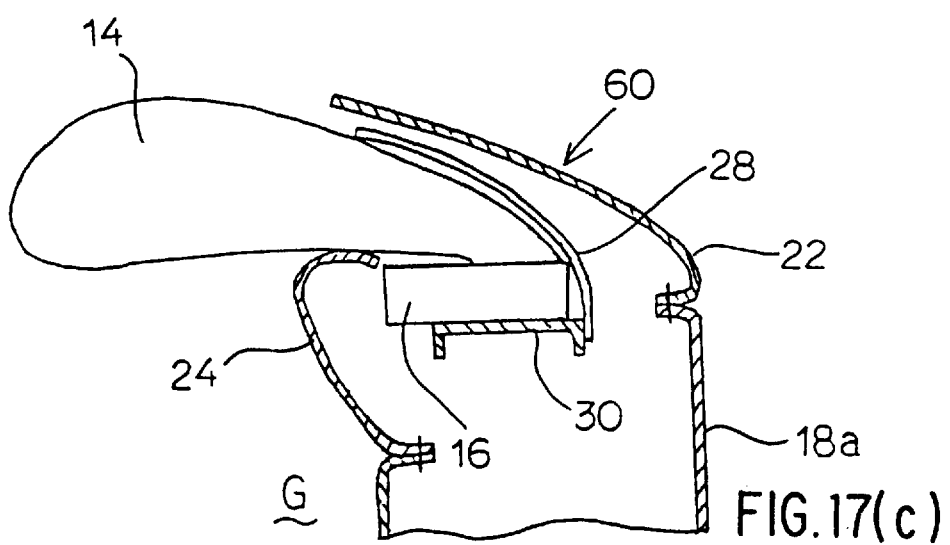

Also when it is disposed like this, as shown in FIG. 17, the pushing force of the air bag 14 is concentrated on the stitching part 26 at the band 28 and the stitching part 26 can be rapidly split open. Also, in the case of this side air bag device 60, since it is possible to fix the fixed member side end 28b to the fixed member 30 from the back of the seat 18 after the seat covering material side end 28a is stitched to the stitching part 26, its manufacture is easy.

Figure 18:
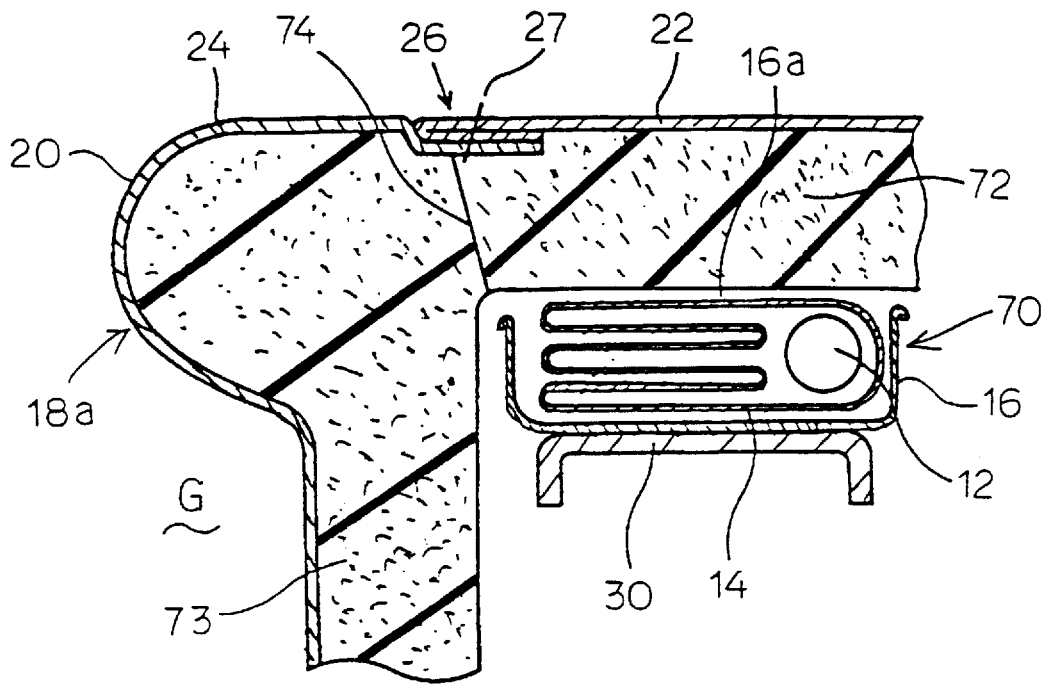
FIG. 18 is a horizontal sectional view showing a side air bag device of an embodiment of a second invention of the invention.

FIG. 18 shows a side air bag device of an embodiment of the second invention of the invention.

In the side air bag device 70 of this embodiment also, as in the side air bag device 10 described above, an air bag case 16 housing an inflator 12 and an air bag 14 is embedded in the compartment wall 20 side of a backrest 18a of a seat 18, a case side covering material 22 and an occupant side covering material 24 are stitched together diagonally in front of the opening 16a in the air bag case 16, and by this stitching part 26 being split open by a predetermined deployment pressure of the air bag 14 the air bag 14 is able to expand between the occupant and the compartment wall 20 in an emergency.

In the side air bag device 70 of this embodiment, a urethane foam pad 72 of a predetermined thickness is interposed between the air bag case 16 and the seat covering material 20. That is, urethane foam pads 72, 73 are disposed not only in the side G of the seat 18 on which the occupant sits but also in the seat side in which the side air bag device 70 is installed. A slit part 74 which allows the air bag 14 to pass through the pad on deployment of the air bag 14 is formed in the part of this pad 72 that is on the inner side of the stitching part 26 of the covering materials 22, 24.

Figure 19:
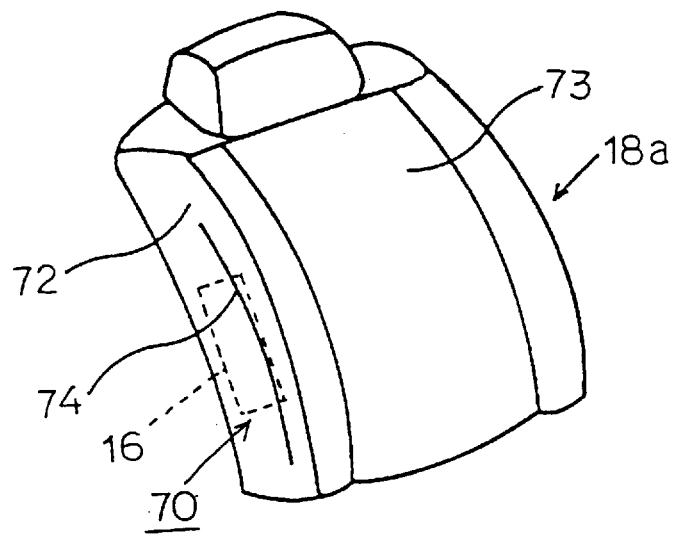
FIG. 19 is a perspective view of a backrest of a seat fitted with this air bag device, with a seat covering material removed.
Figure 20:
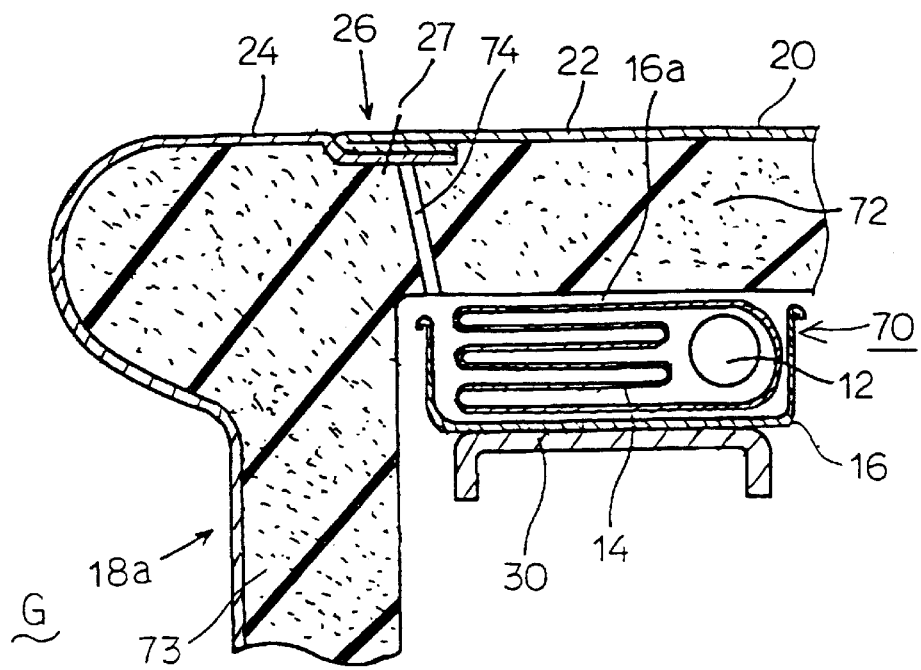
FIG. 20 is a horizontal sectional view showing another example of a slit part of this air bag device.
Figure 21:
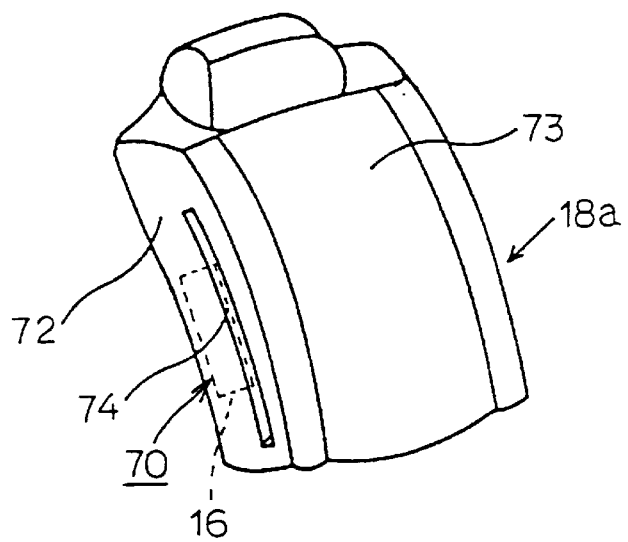
FIG. 21 is a perspective view of a backrest of a seat fitted with the device shown in FIG. 20, with a seat covering material removed.

As shown in FIG. 19, this slit part 74 is formed extending in an up-down direction along the side of the seat backrest 18a alongside the stitching part 26. As this slit part 74, any slit part from the one having no gap shown in FIG. 18 and FIG. 19 to the one having a gap of about 5 mm shown in FIG. 20 and FIG. 21 is suitable, and as the length of the slit, so that the air bag 14 can pass through, about 300 to 500 mm is suitable.

In the side air bag device 70 of this embodiment, because the urethane foam pad 72 is interposed between the air bag case 16 and the covering materials 22, 24 covering it, the feel of the seat from the seat surface is superior. Also, because the slit part 74 is provided in this pad 72, there is the effect that the air bag 14 can pass through on deployment and inflation of the air bag 14 in a predetermined position becomes possible. Even when a slit part 74 is provided in the urethane foam pad 72 like this, because of the presence of the seat covering material 20 on the seat surface, a seat with its feeling maintained is possible.

Figure 22:
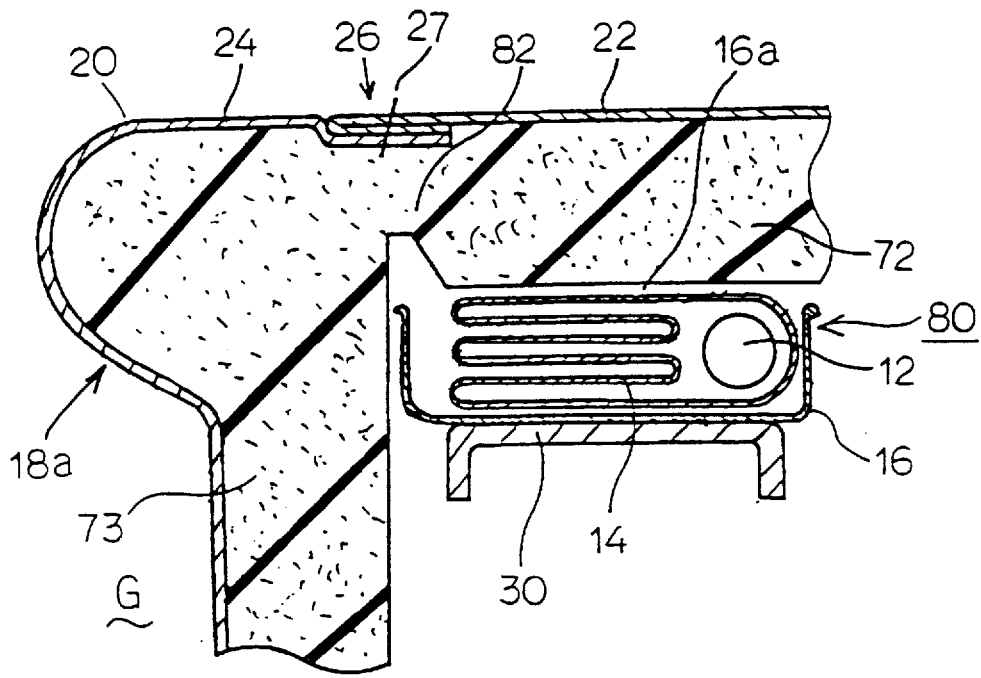
FIG. 22 is a horizontal sectional view showing a side air bag device of another embodiment of the second invention of the invention.

FIG. 22 shows a side air bag device 80 of another embodiment of the second invention. This side air bag device 80 differs from the side air bag device 70 of the embodiment described above in the point that, instead of a slit part 74, a weak part 82 for being split open by deployment pressure of the air bag 14 and allowing the air bag 14 to pass through is formed in the pad 72 disposed between the air bag case 16 and the seat covering material 20. That is, in this example, a weak part 82 made by making the pad thinner than the surrounding is formed in the part of the pad 72 on the inner side of the stitching part 26 extending in an up-down direction along the side of the seat backrest 18a alongside the stitching part 26, and on deployment of the air bag 14 the weak part 82 is split open by the deployment pressure of the air bag 14 and the air bag 14 expands to outside the seat through this gap. When the weak part 82 is formed by locally making the pad thinner like this, it is preferably formed as if by scooping out the inner wall side of the pad 72, as shown in FIG. 22.

Figure 23:
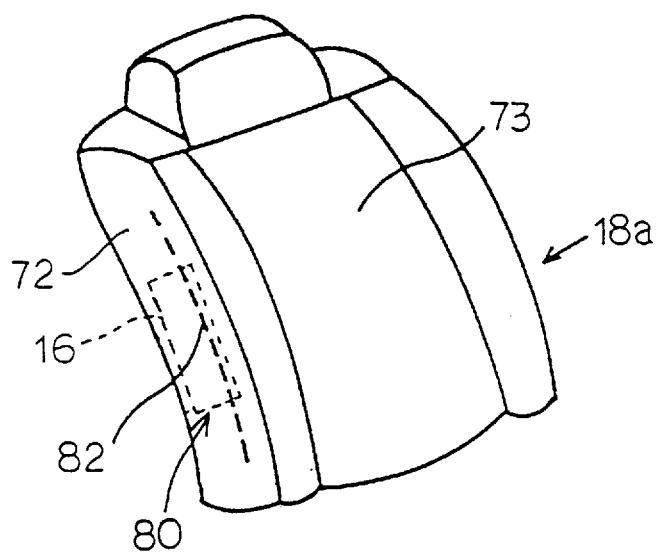
FIG. 23 is a perspective view of a backrest of a seat with a seat covering material removed showing another example of a weak part of this air bag device.

FIG. 23 shows another version of the weak part 82, and in this example the weak part 82 is formed by providing holes or slits in the pad 72 intermittently in the form of a tear line.

In the cases shown in FIG. 22 and FIG. 23 wherein a weak part 82 is formed in the pad 72, because compared to when a slit part 74 is formed the integrity of the urethane foam pad 72 is higher, it is possible to further preserve the feeling of the seat 18. To make the weak part 82 split open easily, a small slit, which will be further discussed later, may be provided in the weak part 82.

Figure 24:
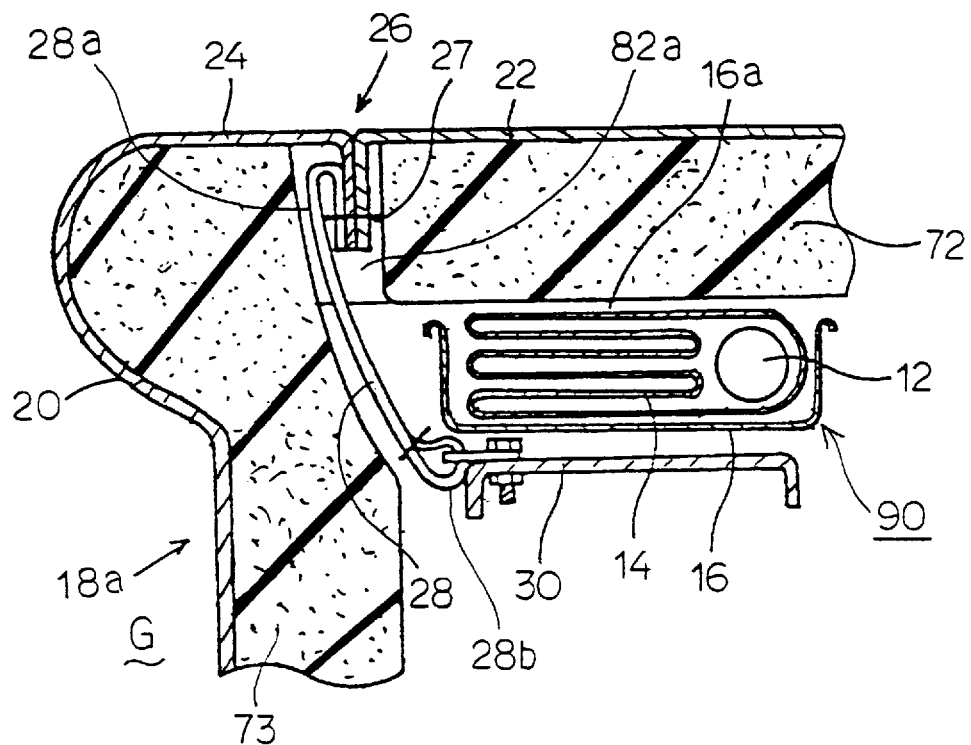
FIG. 24 is a horizontal sectional view of a side air bag device of another embodiment of the second invention of the invention.
Figure 25:
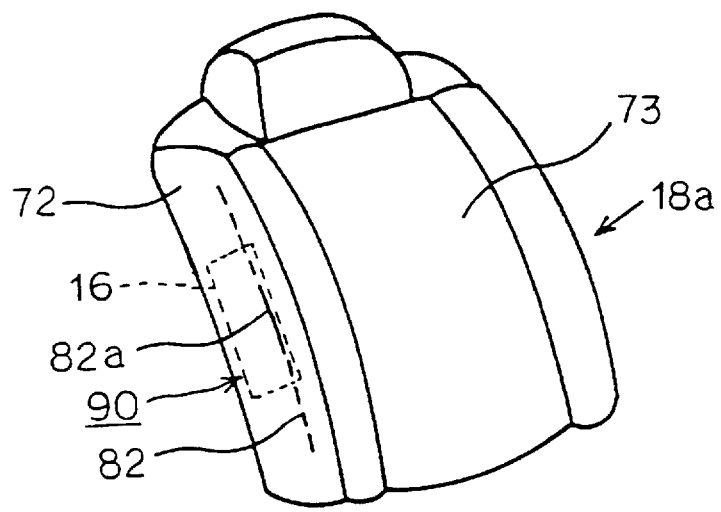
FIG. 25 is a perspective view of a backrest of a seat fitted with this air bag device, with a seat covering material removed.

FIG. 24 and FIG. 25 show a side air bag device 90 of another embodiment of the second invention. This side air bag device 90 is one wherein the construction of the first invention of the invention is added to the side air bag device 80 of the embodiment described above.

That is, in this side air bag device 90, as well as a urethane foam pad 72 being interposed between the air bag case 16 and the covering materials 22, 24, a weak part 82 for splitting open on deployment of the air bag 14 and allowing the air bag 14 to pass through is formed in the pad 72 on the inner side of the seat covering material stitching part 26. This weak part 82 has in the middle thereof a small slit part 82a, and a band 28 for suppressing elongation of the occupant side covering material 24 during inflation of the air bag 14 is disposed passing through this small slit part 82a from inside to outside. The band 28, like that described in detail in embodiments of the first invention, is disposed extending between an occupant side covering material 24 at the stitching part 26 and a fixed member 30 such as a seat frame, and one end 28b thereof is fixed to the fixed member 30 and the other end 28a is co-stitched to the occupant side covering material 24 with stitching thread 27 of the stitching part 26.

With this side air bag device 90, while maintaining the softness of the feel of the seat, it is possible to make the seat covering material stitching part 26 split open rapidly on deployment of the air bag 14. Instead of the weak part 82, a slit part 74 of the kind described above may be provided and the band 28 made to pass through this slit part 74.

Figure 26:
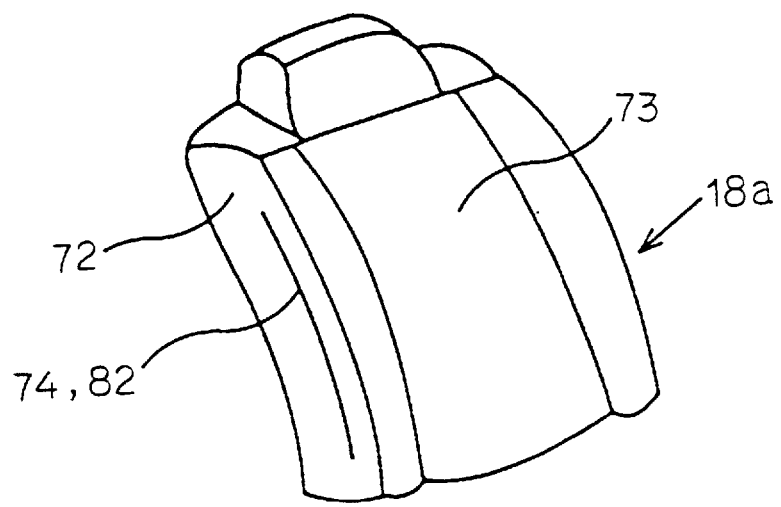
FIG. 26 is a perspective view of a backrest of a seat with a seat covering material removed showing an example of the shape of a slit part or a weak part.
Figure 27:
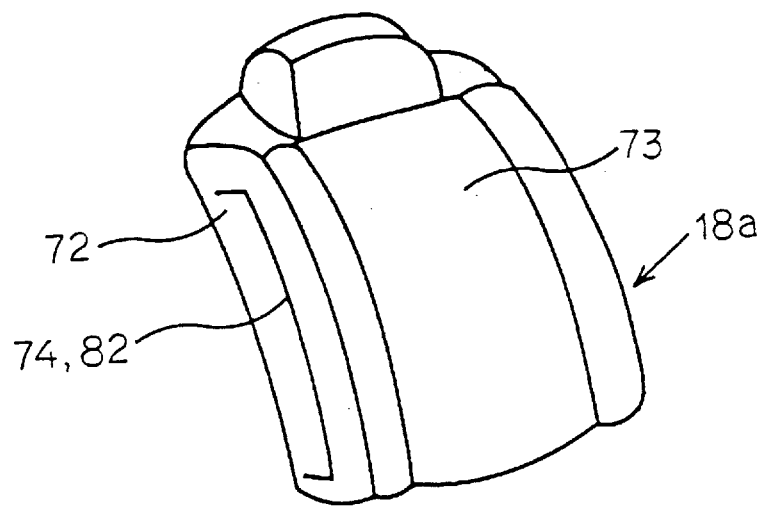
FIG. 27 is a perspective view of a backrest of a seat with a seat covering material removed showing another example of the shape of a slit part or a weak part.
Figures 28A, 28B, 28C, 28D, 28E:
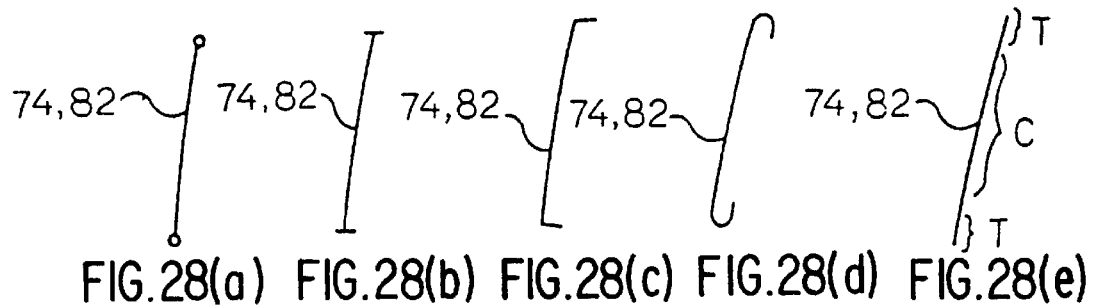
FIG. 28 is sketches of examples of modifications to the slit part or the weak part shown in FIG. 26, in (a) through (d) the shape of the ends of the slit part or the weak part and in (e) the pad thickness around the slit part or the weak part being modified.
Figures 29A, 29B, 29C, 29D, 29E:
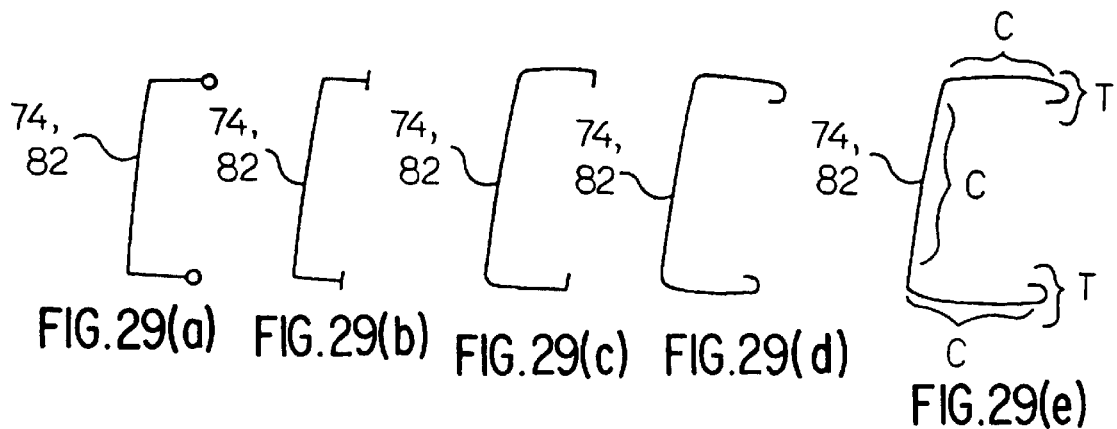
FIG. 29 is sketches of modifications to the slit part or the weak part shown in FIG. 27, in (a) through (d) the shape of the ends of the slit part or the weak part and in (e) the pad thickness around the slit part or the weak part being modified.

In all the embodiments of the second invention described above, the shape of the slit part 74 or the weak part 82 can be made a straight line shape of the kind shown in FIG. 26 or a bracket-like shape of the kind shown in FIG. 27. It is also possible to form the upper and lower ends of the slit part 74 or the weak part 82 into a circle shape as shown in FIG. 28(a) and FIG. 29(a), into a T-shape as shown in FIG. 28(b) and FIG. 29(b), into an L-shape as shown in FIG. 28(c) and FIG. 29(c) or into a U-shape as shown in FIG. 28(d) and FIG. 29(d). Also, as shown in FIG. 28(e) and FIG. 29(e), it is possible to make the thickness of parts of the pad 72 adjacent to the slit part 74 or the weak part 82 thin in a central vicinity C of the slit part 74 or the weak part 82 and thicker with progress toward the end parts T.

By these terminating treatments, in the case of a slit part 74 it is possible to prevent the upper and lower ends thereof from tearing on deployment of the air bag 14 and in the case of a weak part 82 it is possible to make the pad 72 split open with a predetermined shape (that is, it is possible to make splitting-open of the pad end at those positions).

Figure 30:
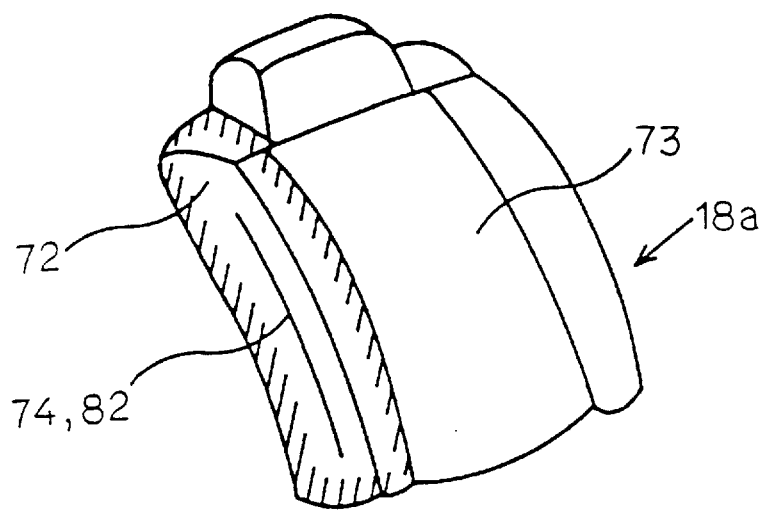
FIG. 30 is a perspective view of a backrest of a seat with a seat covering material removed showing an example wherein a side pad of the seat is made of a foam of a different hardness.

Also, in all the embodiments of the second invention of the invention, as shown as diagonal line areas in FIG. 30, it is possible to form a seat side pad 72 in which a slit part 74 or a weak part 82 is formed, and, depending on the case, the side of the opposite side of the seat, using a urethane foam harder than that of the central pad 73 and integral with the pad 73. In this case, the side pad 72 is formed integrally using for example low molecular weight or highly crosslinked urethane foam of a different hardness.

Because this makes shape maintenance of the slit part 74 or the weak part 82 easy, it is possible to fix the positional relationship of the slit part 74 or the weak part 82 with respect to the air bag 14 and concentrate the deployment pressure of the air bag 14 on the slit part 74 or the weak part 82, and the position at which the pad 72 splits open can also be fixed. That is, when the pad 72 is of low hardness, sometimes for example under the body weight of an occupant partially it is not possible to maintain the predetermined shape of the pad and its cross-sectional shape and contours deform, and consequently the obtained effect of stress concentrating at the slit part 74 or the weak part 82 might decrease; however, by making the side pad 72 hard as described above it is possible to eliminate this problem.

Figure 31:
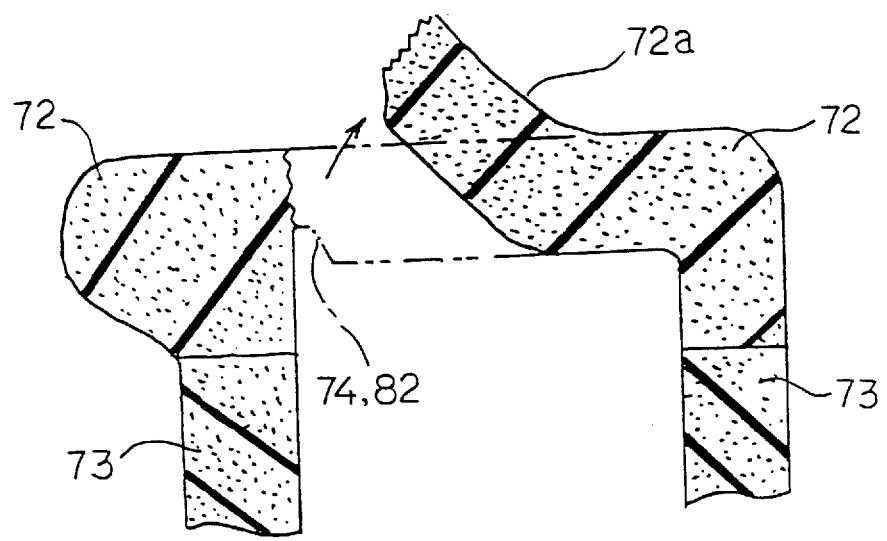
FIG. 31 is an outline sectional view showing a state of the side pad of the seat of the preceding figure on splitting-open.

Also, because it is possible to make the pad 72 highly elastic with respect to the deployment pressure of the air bag 14, the strength of a hinge part 72*a* of the pad 72 opening outward after splitting as shown in FIG. 31 can be increased. Furthermore, making the seat side pads harder is also effective in increasing the firmness with which the occupant is held in the seat.

Figure 32:
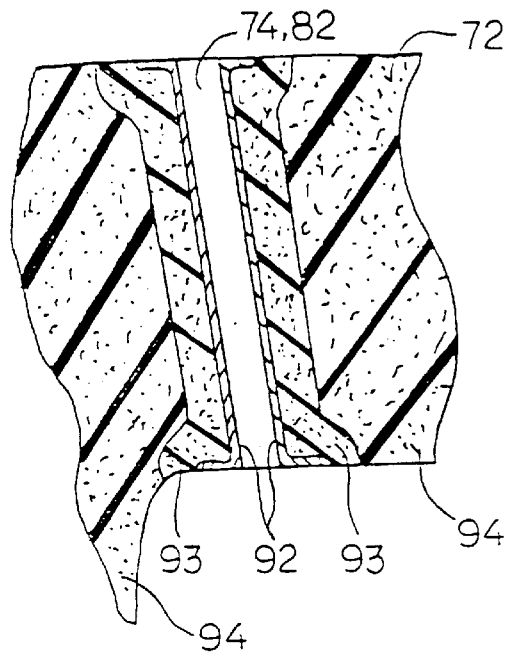
FIG. 32 is a sectional view showing a skin layer formed at the pad surface in the vicinity of a slit part or a weak part.

Also, in all the embodiments of the second invention, by adjusting the surface temperature of molds and the foam pressure during urethane foam molding, a solid skin layer 92 of thickness about 30 to 200 $\mu$m may be formed at the surface of the pad 72 in the vicinity of the slit part 74 or the weak part 82, as shown in FIG. 32.

Figure 33:
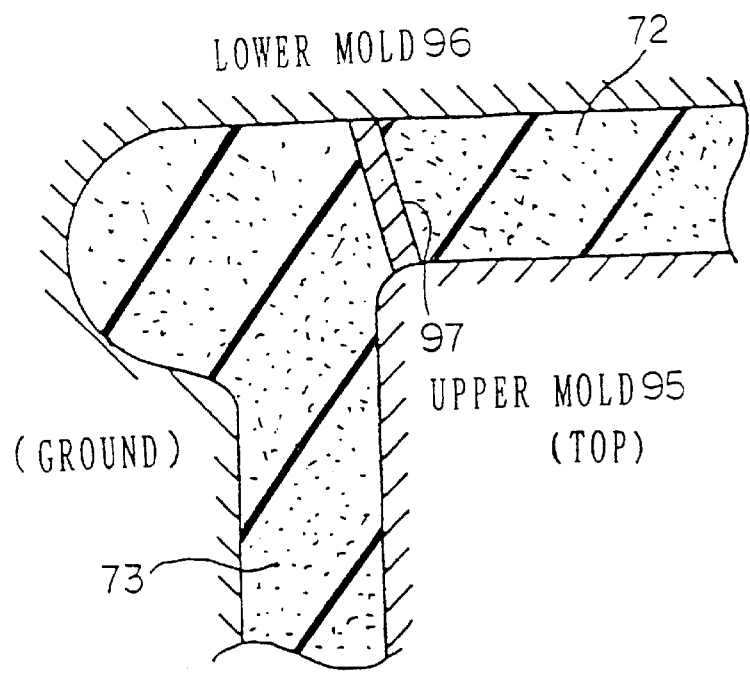
FIG. 33 is a sectional view of a mold illustrating an example of molding of a seat pad.

For example, as shown in FIG. 33, when carrying out urethane foam molding using an upper mold 95 and a lower mold 96, the above-mentioned skin layer 92 can be formed by making the temperature of a mold forming piece 97 for forming a slit part 74 or a weak part 82 lower than the surface temperature of the rest of the upper and lower molds 95, 96. In this case, as shown in FIG. 32, a skin layer 92 is formed at the surface of the urethane of the slit part 74 or the weak part 82 for the air bag 14 to pass through on deployment, and from the surface by way of a microcell layer 93, which is a fine foam layer, to a cell layer 94 which is an ordinary foam layer, the foam diameter successively increases. By forming a skin layer 92 like this it is possible to protect the surface of the pad 72 with which the air bag 14 makes contact on deployment of the air bag 14 and splitting-open of the pad 72 with a neat split surface is possible.

The slit part 74 and the weak part 82 in all the embodiments of the second invention can also be formed by a cutting process using a cutter knife or a sander or the like. A cutting process can be carried out easily by hand without special equipment being required and is suitable for low-volume production, and molding is suitable for mass-production.

Industrial Applicability

In a side air bag device of this invention, because a band for starting splitting-open of a stitching part is provided, the stitching part can be split open rapidly and because a strength balance between the seat covering material and the stitching thread can be achieved easily it is possible to greatly increase productivity.

Also, in a side air bag device of the invention, because a seat pad is interposed between the air bag case and the seat covering material, it is possible to install the side air bag device in a seat without impairing the softness and feeling of the feel of the seat.

We claim:

1. A side air bag device which is an air bag device embedded in a compartment wall side of a seat of a vehicle wherein a seat covering material has in the vicinity of an air bag case opening a stitching part where a case side covering material covering the opening and an occupant side covering material are stitched together by said stitching part and this stitching part is to be split open by means of a predetermined deployment pressure of an air bag, said side air bag device characterized in that a seat pad of a predetermined thickness is interposed between the air bag case and the seat covering material and a slit part or a weak part for allowing the air bag to pass through on deployment is formed in the pad on the inner side of the stitching part, and also a band for suppressing elongation of the occupant side covering material on deployment of the air bag is provided extending between the occupant side covering material at the stitching part and a fixed member such as a seat frame, one end of the band is fixed to the fixed member and the other end of the band is co-stitched to the occupant side covering material by means of stitching thread of the stitching part.

2. A side air bag device according to claim 1, characterized in that the shape of the slit part or the weak part forms a straight line shape or a bracket-like shape.

3. A side air bag device according to claim 2, characterized in that an end of the slit part or the weak part is terminated into a circular shape, a T-shape, an L-shape or a U-shape.

4. A side air bag device according to claim 1, characterized in that the thickness of a part of the seat pad adjacent to the slit part or the weak part is made thin in the vicinity of the center of and thick at an end of the slit part or the weak part.

5. A side air bag device according to claim 1, characterized in that a part of said seat pad in a side of the seat in which the slit part or the weak part is formed is made harder than a part of said seat pad of another part of the seat and is formed integrally with the part of said seat pad of the other part of the seat.

6. A side air bag device according to claim 1, characterized in that a skin layer of thickness 30 to 200 $\mu$m is formed at the surface of the pad in the vicinity of the slit part or the weak part.

\* \* \* \* \*